(Model.)

W. BOUGHTON.
VEHICLE SPRING.

No. 273,449. Patented Mar. 6, 1883.

Witnesses
P. B. Turpin,
J. N. Griffin,

Inventor:
William Boughton
By R. S. & A. P. Lacey
Att'ys

UNITED STATES PATENT OFFICE.

WILLIAM BOUGHTON, OF CALEDONIA, OHIO.

VEHICLE-SPRING.

SPECIFICATION forming part of Letters Patent No. 273,449, dated March 6, 1883.

Application filed October 25, 1882. (Model.)

*To all whom it may concern:*

Be it known that I, WILLIAM BOUGHTON, a citizen of the United States, residing at Caledonia, in the county of Marion and State of Ohio, have invented certain new and useful Improvements in Vehicle-Springs; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention has relation to improvements in vehicle-springs; and it consists in the construction, combination, and arrangement of the several parts, as will be hereinafter fully described, and specifically pointed out in the claims.

Figure 1:
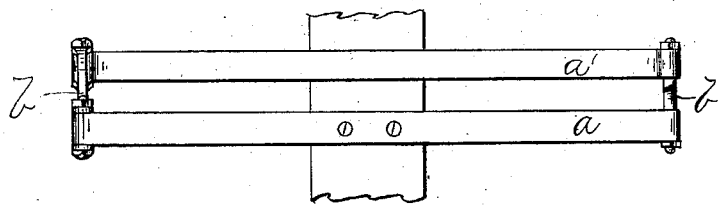
Figure 2:
Figure 3:
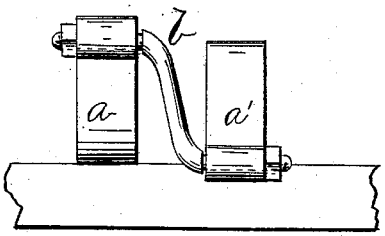
Figure 4:
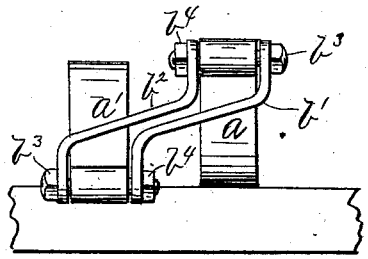

In the drawings, Figure 1 is a plan view, Fig. 2 is a side view, and Figs. 3 and 4 are end views, of a spring constructed according to my invention.

$a$ represents one and $a'$ the other bar of the spring. These bars are arranged a slight distance apart, and are parallel their entire length. I turn the ends of the bars under to provide loops $a^2$, through which are passed the ends of of the connecting-bars hereinafter described. The middle portion of the bar $a$ is ordinarily below that of the bar $a'$, while its ends are bent up above the ends of the said bar, as shown.

$b$ is the connecting-rod. This rod may be formed of a single bar, as shown in Fig. 3; but I prefer to construct it as shown in Fig. 4, as by such construction I secure greater strength and a finer bracing of the parts. This connection is formed of two bars, $b'$ $b^2$, and two fastening-bolts, $b^3$. The bar $b'$ is secured on the front side of spring-bar $a$, and is carried vertically downward a short distance, then deflected rearward at an incline, as shown, and continued in a vertical bar down to the front side of spring-bar $a'$, the bar being composed of the two parallel end portions and the deflecting intermediate portion, as shown. The connecting bar $b^2$ is made like the bar $b'$, and extends from the rear side of bar $a$ to the rear side of bar $a'$. These connection-bars are provided in their ends with holes, through which are passed the bolts $b^3$, which extend through the loops formed by the turned ends of the spring-bars, and are secured by nuts $b^4$. By preference I form the opening through one of the bars $b'$ $b^2$ angular, and provide the bolt $b^3$ with a corresponding angular portion, so that the friction of the bolt will not be on the bars $b'$ $b^2$, but on the broad surface of the inside of the loop formed by the turned ends of the spring-bars $a$ $a'$.

In the application of my spring I secure the spring-bar $a$ to the axle by clips or bolts, and clip or bolt the bar $a'$ directly to the end sills of the vehicle-body, thus avoiding the necessity of spring-bars and body-loops. The bar $a'$, being arranged in rear of the bar $a$, which is secured to the axle, and the body being secured directly to it instead of to body-loops, a larger buggy-body may be used with the same length of gear than where the ordinary springs are used. By the connection described the spring-bars are extended parallel their entire length, avoiding all weakening lateral bends thereof, and they are secured so that they are held firmly without any lateral play toward each other, preventing the forward and back motion of the body so disagreeable to the rider, and preventing the wearing and bruising of the buggy-body against the axle and head-block.

It will be seen that by increasing the length of the vertical or parallel portions of the connecting-bars, the deflecting portion remaining the same, the buggy-body may be set as low down as desired.

When springs are constructed with both axle and body spring bars secured at their ends on the same rod or bolt, the motion of one is communicated so abruptly to the other that a disagreeable throw is given to the vehicle-body. I overcome this by supporting each of the bars on separate bolts or rods and connecting these bolts by connection-rods, as shown, forming a double joint at each end of the spring.

Having thus described my invention, what I claim, and desire to secure by Letters Patent, is—

1. In a vehicle-spring, the combination of the spring-bars $a$ $a'$, having the ends and connecting-eyes of the one bar brought to a plane below the plane of the ends and connecting-eyes of the other bar, and rods or hangers connecting the adjacent ends of said bars, substantially as set forth.

2. In a vehicle-spring, the combination of a semi-oval spring-bar, $a$, provided with connecting eyes or bearings at its ends and having its convex side turned downward, hangers or connecting-rods held and turning in the eyes or bearings at the ends of spring-bar $a$ and depending therefrom, and the semi-oval spring-bar $a'$, placed alongside of the bar $a$, and having its convex side turned upward and its middle or central portion arranged in a plane above the middle portion of spring-bar $a$, and its ends brought to a plane below the plane of the ends thereof and made fast to the lower ends of the depending hangers, substantially as and for the purposes set forth.

In testimony whereof I affix my signature in presence of two witnesses.

WILLIAM BOUGHTON.

Witnesses:
JOHN F. McNEAL,
T. B. ROGERS.